(12) United States Patent
Madanahalli et al.

(10) Patent No.: US 12,095,790 B2
(45) Date of Patent: Sep. 17, 2024

(54) METHODS AND SYSTEMS TO MONITOR GROUPS OF SENSORY DATA FOR MALICIOUS BEHAVIORS THROUGH STATISTICAL ANALYSIS

(71) Applicant: 802 Secure, Inc., Pleasanton, CA (US)

(72) Inventors: Ashok Madanahalli, Saratoga, CA (US); Konrad Grutzmacher, Berkeley, CA (US); Garry Drummond, Pleasanton, CA (US)

(73) Assignee: 802 Secure, Inc., Pleasanton, CA (US)

( * ) Notice: Subject to any disclaimer, the term of this patent is extended or adjusted under 35 U.S.C. 154(b) by 523 days.

(21) Appl. No.: 17/447,038

(22) Filed: Sep. 7, 2021

(65) Prior Publication Data

US 2022/0417274 A1    Dec. 29, 2022

Related U.S. Application Data

(60) Provisional application No. 63/216,344, filed on Jun. 29, 2021.

(51) Int. Cl.
*H04L 9/40* (2022.01)
*G06N 20/20* (2019.01)

(52) U.S. Cl.
CPC ......... *H04L 63/1425* (2013.01); *G06N 20/20* (2019.01); *H04L 63/1441* (2013.01)

(58) Field of Classification Search
CPC ........................ H04L 63/1425; H04L 63/1441
USPC .......................................................... 726/23
See application file for complete search history.

(56) References Cited

U.S. PATENT DOCUMENTS

| | | | |
|---|---|---|---|
| 8,156,544 B2 | 4/2012 | Fuccello | |
| 8,966,631 B2 | 2/2015 | El-Moussa | |
| 9,038,184 B1 | 5/2015 | Mann | |
| 9,672,355 B2 | 6/2017 | Titonis et al. | |
| 9,967,278 B2 | 5/2018 | Jevans et al. | |
| 2006/0020924 A1 | 1/2006 | Lo et al. | |
| 2011/0023118 A1 | 1/2011 | Wright | |
| 2018/0191746 A1 | 7/2018 | De Knijf et al. | |
| 2021/0331668 A1* | 10/2021 | Udipi | G06Q 10/0635 |

* cited by examiner

*Primary Examiner* — Anthony D Brown
(74) *Attorney, Agent, or Firm* — Womble Bond Dickinson (US) LLP (57) ABSTRACT

Methods and systems for threat monitoring and analysis are disclosed. Data is collected, over a protected network, from a data stream provided by at least one data source connecting to the protected network. Machine learning (ML) models are trained for the data stream utilizing the collected data. The ML models include a first ML model to establish a baseline value, an allowed threshold value range, and a threshold value for the data from the data source, and a second ML model to identify outlier data. The outlier data is outside of the allowed threshold value range from the baseline value and exceeds the threshold value in the data stream. The ML models are used to determine whether one or more anomalies indicating a cyber threat exist within the collected data. Responsive to determining that the anomalies exist, it is determined whether to provide a response action.

20 Claims, 4 Drawing Sheets

METHODS AND SYSTEMS TO MONITOR GROUPS OF SENSORY DATA FOR MALICIOUS BEHAVIORS THROUGH STATISTICAL ANALYSIS

CROSS REFERENCE TO RELATED APPLICATIONS

This application claims the benefit of U.S. Provisional Application No. 63/216,344 filed on Jun. 29, 2021, the disclosure of which is incorporated herein by reference.

TECHNICAL FIELD

Embodiments of the application relate generally to cyber threats monitoring. More particularly, embodiments of the application relate to the evaluation of cyber threats using artificial intelligence (AI) and machine learning (ML).

BACKGROUND

The use of wireless connections for collection of data and control of devices is increasing at a fast pace across the globe. The wireless connectivity is being further accelerated due to the fast pace of introduction of Internet of Things (IoT) devices. The current wireless connections are mainly through Wi-Fi, Bluetooth, cellular (e.g., 3G, 4G and 5G) and low-power wide area network (LPWAN) (e.g., Zigbee, Sigfox, NBIot, etc.). New protocols for wireless connectivity are also being investigated for use with existing and new specialized use cases. The wireless connected applications today cover low security impact applications such as interpersonal communications and transfer of pictures and messages over public platforms to high security applications covering financial transactions and weapon systems.

Even though the need is great, currently there is limited security and intrusion protection capability available for wireless accessed devices. European Telecommunication Standards Institute (ETSI) initiative is spearheading the cybersecurity and connectivity support for these wireless connected devices/networks today under the Multi-Access Edge computing initiative.

It has been found that most security breaches happen through attackers accessing security vulnerabilities that exist in networks connecting on to a secure network over wireless. Especially in the high security arena, this is becoming a reality. Hence, checking and monitoring the data transfer operation at access locations—gateways and hot spots connecting external networks, even known secure networks connecting into the protected secure network has become a priority.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Methods and systems for threat monitoring and analysis are disclosed. Data is collected, over a protected network, from a data stream provided by at least one data source connecting to the protected network. Machine learning (ML) models are trained for the data stream utilizing the collected data. The ML models include a first ML model to establish a baseline value, an allowed threshold value range, and a threshold value for the data from the data source, and a second ML model to identify outlier data. The outlier data is outside of the allowed threshold value range from the baseline value and exceeds the threshold value in the data stream. The ML models are used to determine whether one or more anomalies indicating a cyber threat exist within the collected data. Responsive to determining that the anomalies exist, it is determined whether to provide a response action.

In an embodiment, to use the ML models to determine whether the one or more anomalies exist within the collected data, the second ML model is used to check data elements of the collected data for one or more outliers. Each outlier has a value that is outside of the allowed threshold value range from the baseline value and exceeds the threshold value. When the outliers are identified, the outliers are enriched with enrichment information. It is determined that the enriched outliers are the anomalies that exist within the collected data.

In an embodiment, the response action is provided when the anomalies comprise a number of anomalies.

In an embodiment, to provide the response action, the data source is disconnected from input the protected network.

In an embodiment, it is determined not to provide the response action when the anomalies comprise a single anomaly. The single anomaly may be provided to an operator for remedial decision.

In an embodiment, the collected data is consolidated and converted into a format (e.g., time series format). To train the ML models utilizing the collected data, the ML models may be trained utilizing the consolidated and converted data.

In an embodiment, to collect the data from the data stream, the data is pulled by invoking an application programming interface (API) call to a public Internet service, multi-access mobile edge, or cellular mobile carrier; or the data is collected as a file in a file format.

In an embodiment, the data is collected by software defined radios distributed across the protected network.

In an embodiment, the consolidated and converted data is stored as historical time series information. The historical time series information may be continually updated with new collected data from the data stream.

In an embodiment, the collected data is continuously provided to the first ML model to update the established baseline value, the allowed threshold value range, and the threshold value using the data collected from data stream from the at least one data source.

Embodiments of the application provide a capability using artificial intelligence (AI) and machine learning (ML) for the wireless systems to evaluate the cyber threats using data analysis and statistical behavioral analysis of the data movement into and out of a protected system during operation. This evaluation may include known groups of devices connecting to the protected network based on type, behavioral pattern, geolocation or data activity and also individual devices connected over wireless communication capability to a protected network. The evaluation using AI, ML and statistical methods provide a view of anomalies in the transactions processed during connected operation allowing remedial action to be initiated based on any identified anomalies.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The term "software" refers to any executable code capable of running on a processor, regardless of the media used to store the software. Thus, code stored in non-volatile memory, and sometimes referred to as "embedded firmware," is within the definition of software. Further, the term "system" refers to a collection of two or more parts and may be used to refer to a computer or networking system or a portion of a computer or networking system.

The term artificial intelligence (AI) refers to capability of systems having sensing capability and processing power to be able to perform tasks that normally require human intelligence, such as visual perception, speech recognition, decision-making, and translation between languages. Machine learning refers to applications of artificial intelligence (AI) in machines that provides these machine systems with the ability to automatically learn and improve from experience operations/computations without being explicitly programmed.

As used herein, data enrichment or data augmentation refers to a process of enhancing existing information by supplementing missing or incomplete data to produce enrichment information. For example, data enrichment may be achieved by using external data sources, but that is not always the case. This can also be done by appending or otherwise enhancing collected data with relevant context obtained from additional sources to produce the enrichment information. It is also possible to enrich the information provided by one source with data from another.

As examples: 1) If a user name is identified in a data stream, that user name can be enhanced with available data from any identity and access management data set, such as users actual name, postal address, work designation, clearance for access, etc. 2) Similarly, if an employee number in an enterprise is available, the data can be enhanced with available data from the data set available from enterprise data base with the individual's designation, clearances, contact phone number, location, etc. 3) If the data stream contains a driver's license, it can be enhanced with information available from the Department of Motor Vehicle's (DMV) database.

As used herein, data conditioning refers to the use of data management and optimization techniques that may result in the intelligent routing, optimization and protection of data for storage or data movement in a computer system. Data conditioning features may enable systems to dramatically improve system utilization and increase application performance lowering both capital expenditures and operating costs.

The use of wireless connections for collection of data and control of devices is increasing at a fast pace across the globe. The wireless connectivity is being further accelerated due to the fast pace of introduction of IoT devices. The current wireless connections are mainly through Wi-Fi, Bluetooth, cellular (e.g., 3G, 4G and 5G) and LPWAN (e.g., Zigbee, Sigfox, NBIot, etc.). New protocols for wireless connectivity are also being investigated for use with existing and new specialized use cases. The wireless connected applications today cover low security impact applications such as inter-personal communications and transfer of pictures and messages over public platforms to high security applications covering financial transactions and weapon systems. It is a need in the industry for a capability to identify fraudulent activity and to provide security and fraud prevention to the wireless applications based on such identification. The disclosed application uses the power of artificial intelligence (AI) and machine learning (ML) capability available today to establish a statistical baseline for operation of groups of devices based on type, location or activity and also individual devices connected over wireless communication capability. The statistical cyber threat evaluation uses the data analysis and statistical behavioral analysis capability available to extract a base line of operational connectivity and application utilization of the connections to generate the baseline.

In some embodiments, a threat monitoring and analysis system described herein may start by collecting historical information of data flow (or data stream) from various data sources to establish initial baselines and thresholds.

During regular operation of a network, data moving information and out of the network is sensed and information regarding data transfer to and from devices and networks connecting to a protected network is collected using distributed sensors (e.g., software defined radios). These sensors may be distributed over the protected network and enabled to continuously scan a radio spectrum to identify devices and network connecting to the protected network. The collected information may be consolidated, as time series data for example, and used by the threat monitoring and analysis system to identify probable problems and threats to the protected network. For example, the consolidated information may be provided to an ML learning module to train AI/ML algorithms/models to establish updated baseline values, threshold values, and threshold value ranges, in order for the system to identify outliers.

Figure 1:
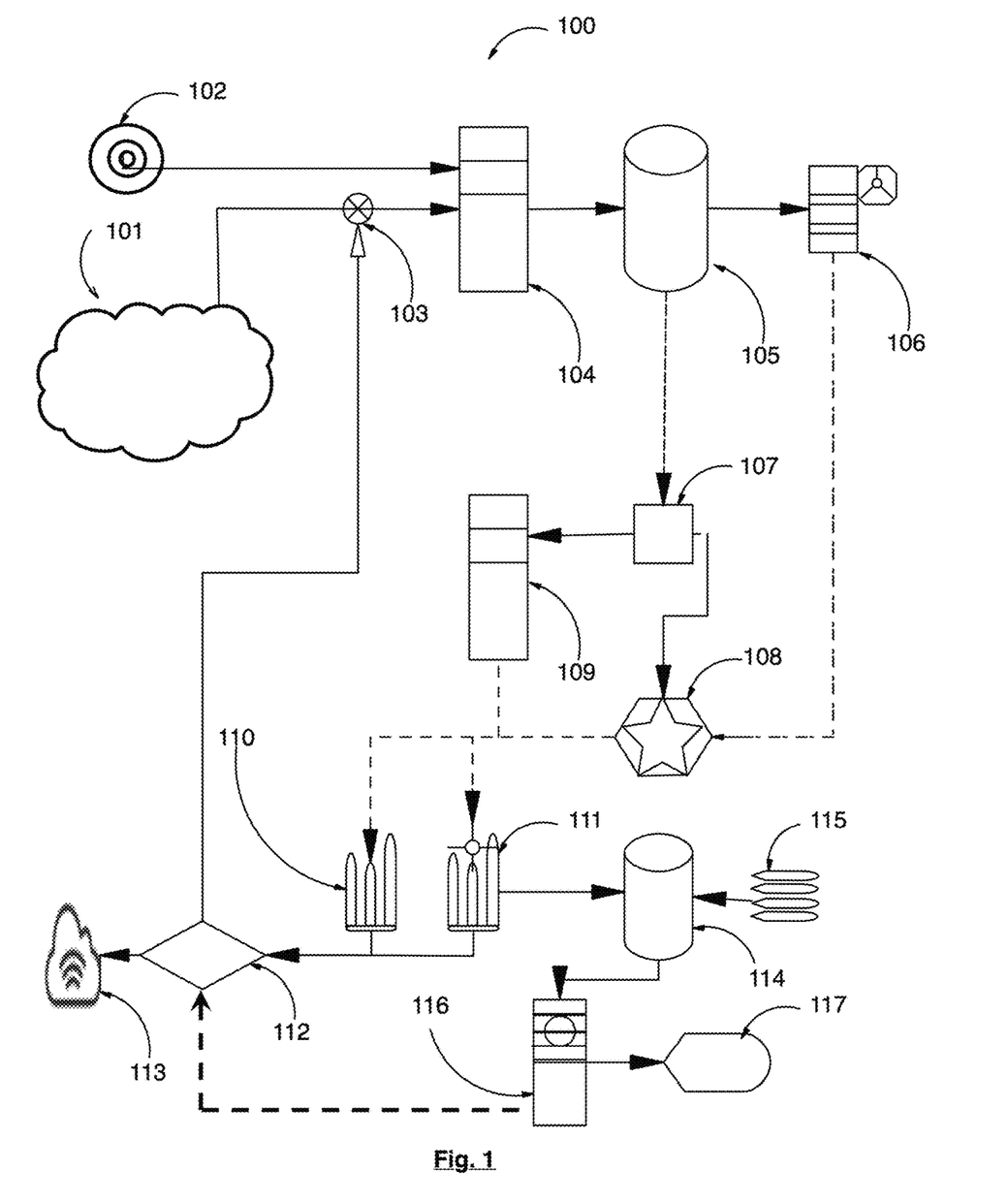
FIG. 1 is a block diagram illustrating a threat monitoring and analysis system according to an embodiment.

FIG. 1 is a block diagram illustrating a threat monitoring and analysis system according to an embodiment. In FIG. 1, system 100 may train an artificial intelligence and machine learning algorithm/model to statistically analyze available initial operational information relating to any and all of the data sources connecting to a protected network. The AI/ML module statistically generates expected value from estimation and prediction, identifies threats to the network and provides a response capability to identified threats. Referring to the treat monitoring and analysis system 100 of FIG.

1, in order to establish a baseline usage pattern data usage, in an embodiment information is extracted from carrier services, such as public Internet services cloud based Multi-Access Edge Computing (MEC) devices that move data traffic and services from a centralized cloud to the edge of the network to facilitate ease of data access and private connections, over network 101, using for example data calls to interface application programs (APIs), to pull the information. In another embodiment, where such pull capability is unavailable the information is collected in a file format 102, for example by the carrier services, and pushed to the threat monitoring and analysis system 100, Network 101 may be any type of networks such as a local area network (LAN), a wide area network (WAN) such as the Internet, a cellular network, a satellite network, or a combination thereof, wired or wireless.

In an embodiment, the pushed information is extracted and entered into the threat monitoring and analysis system 100. The incoming data information may be ingested and consolidated by data consolidation module 104 of the threat monitoring and analysis system 100. Once consolidated the data may be saved in a database 105 as historical time series information. For example, in an embodiment, data consolidation module 104 may convert the consolidated data into a particular format (e.g., time series format). The historical time series information may also be continually updated using information collected during operation of the threat monitoring and analysis system 100. In an embodiment, information for fixed periods of time (pulled from or pushed to the system 100 from the sources mentioned above) may also be conditioned and digitized by an ML training module 106, and used by module 106 to train AI/ML algorithms/models (not shown), which may include an estimation model and/or a prediction model, as described in more detail herein below. The consolidated data (e.g., stored in database 105) may be sent to a data analysis decision module 107 that distributes the consolidated data to an AI/MI, analysis module 108 for ML based analysis (e.g., using the AI/ML algorithms/models trained by ML training module 106), and to a non-ML analysis module 109 for standard analysis of collected data and refining any anomaly identified by the AI/ML analysis module 108. In an embodiment, the non-ML analysis module 109 may check for known problems (or threats) that have been identified in a data stream, such as known virus inclusions and other known ways of attacking a protected network. The AI/ML, analysis module 108 and the non-ML analysis module 109 may analyze the data to determine the existence of a threat or anomaly. For example, AI/ML analysis module 108 may check data points or elements of observed data for inlier data 110 and outlier data (or outliers) 111. The identified outliers allow prediction of an anomaly. Any inlier data 110 is validated and the connection is enabled allowing event delivery 113. When outlier data is identified, it is enriched with enrichment information 115, device related information collected from third party vendors, device group related information, behavioral patterns and geolocation related information collected from distributed radios and sensors covering a protected network space (e.g., network 101). Those information may be stored in anomaly database 114. The enriched outlier data may be sent to a threat decision console 116 for anomaly based decision making. The threat decision console 116 is enabled to make a decision with or without external input via an input/output module or system 117 on whether to allow a connection to remain or be disconnected from the protected network via a decision module 112 and a disconnect capability 103 (e.g., a blocking signal, software or hardware disconnect switch) to stop data flow from an identified source. The input/output module 117 enable human interaction with the system on the decision making process when required. For example, system recommendations may be checked and overridden by an operator, via input/output module 117, to enable protection or allow data inflow from known safe connections, even with identified outlier conditions during operation. In some embodiments, input/output system 117 may include input devices such as, but not limited to, a voice input device, touch input device, keyboard, mouse, pen, touch input display device, etc. In addition, system 117 may also include output devices such as, but not limited to, a display device, speakers, printer, etc.

Considering the collected and stored data of each data stream, such as shown in the example Table 1 below, shown as "Data", the AI/ML analysis module 108 with ML capability is used to compile an estimation model for data stream from a specific source, as shown in Table 1. The time based analysis also provides a predicted usage (or prediction) model for the data stream in a univariate series, as shown in Table 2. This is done by time series machine learning that generates a base line of data operations, an expected value, and an expected range for the data stream allowing the AI/ML analysis module 108 to identify any outliers outside a preset threshold of the expected range and predict that they are anomalies requiring evaluation.

As can be envisaged, data from the data streams from sources connecting to the protected are network may be continuously collected, conditioned and stored. The stored data updates the historic data. The collected data may be provided to the ML models to update the generated base line of data operations, the expected value, and the expected range for the data stream and to analyze and identify any outliners.

The estimation and prediction model examples are shown in Table 1 and Table 2 respectively.

TABLE 1

(Estimation)

| | Data | Expected Value | Point Outliers |
|---|---|---|---|
| Estimation models | $\{x_{t-k_1}, \ldots, x_t, \ldots, x_{t+k_2}\}$ | $\hat{x}_t$ | $|x_t - \hat{x}_t| > \tau$ |

TABLE 2

(prediction)

| | Data | Expected Value | Point Outliers for predicting anomaly |
|---|---|---|---|
| Prediction models | $\{x_{tn}, \ldots, x_{t1}\}$ | $\hat{x}_t$ | $|x_{ti} - \hat{x}_t| > \tau$ |

When the system is implemented and operating in practice, a series of radios (e.g., software defined radios) distributed across a monitored network to be protected using the threat protection system 100 are used to monitor connections to a network and its data transfer operation. These radios may extract the activity by monitoring connected devices connected to the network, for example, over wireless links at a network edge. The radios may collect information on all activities in a monitored network space and feed the collected information into system 100. The system 100, using the AI/ML analysis module 108 for example, may compile a data stream for pre-fixed time periods for each connected device and for each group of devices grouped by characteristics, behavior, and/or geolocation. The AI/ML analysis module 108, using a trained prediction model for example, may check to confirm that data elements of data stream $x_{ti}$ are within an expected/allowed threshold value range estimated and below the threshold $\tau$ set for identification of anomalies. If any input received $x_{ti}$ deviates from the expected value and goes over the set threshold $\tau$, then that element is considered an anomaly as shown in FIG. 2.

Figure 2:
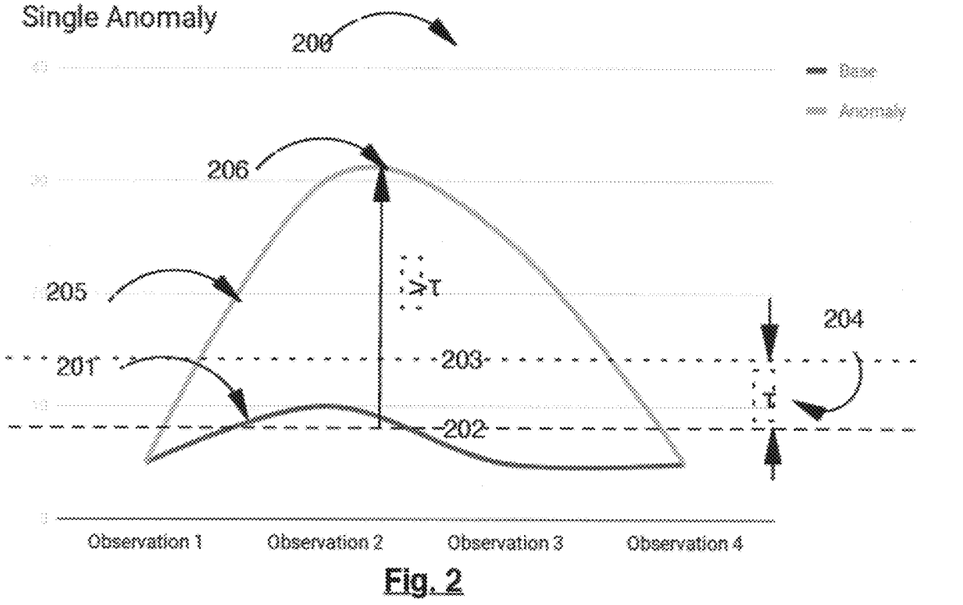
FIG. 2 is a diagram illustrating an example anomaly where an activity level exceeds a set threshold over an expected/predicted level from a data source.

FIG. 2 is a diagram illustrating an example anomaly where an activity level exceeds a set threshold over an expected/predicted level from a data source. In FIG. 2, graph 200 includes a time series base line 201 having an expected value $\hat{x}_t$ 202, and outlier recognition threshold 203 having a value $\tau$ 204, and also showing an outlier 205 that is an anomaly having out of range values 206 that exceed the anomaly threshold value of $\tau$ 204 set for identification of anomalies.

Under normal operation of the threat monitoring and analysis system 100, both normal data (inlier data 110) and anomaly (outliers 111) may be identified by the time series analysis by the AI/ML analysis module 108. A single anomaly, such as anomaly 205, when identified, may not be indicative of a significant behavior change. This may be the result of a minor change in the network connections, for example due to a device restart, software update, or other heavier usage need. Such may be observed and analyzed and stored in an event storage database 114. The event data may be enriched by combining with device data from a device enrichment table that may identify specific source and collection devices used and their characteristics to enhance the identification of threat possibilities as they are stored in the database 114. The event (which may be recognized and analyzed as an anomaly) may then be sent to threat decision console 116 for deciding whether a threat based response action is necessary. The threat decision console 116 may provide supervisory intervention via input/output system 117. Any response action required is intimated or communicated to console 116, which may disconnect the data source from the input to the network 101 (e.g., using disconnect capability 103). A single anomaly, such as anomaly 205, may rarely trigger an active threat prevention response from the threat analysis system 100, as a single instance of data transfer that falls outside a set threshold can occur in a connected network due to any of the reasons enumerated above. However, if multiple cases of anomalies happen either at a device, a group of similar devices from a manufacturer, device type, at a time of day or within a geo-location, that may be considered indicative of a threat pattern. These anomalies once provided to the console 116 are evaluated by the decision console 116 to determine whether it is necessary to trigger a disconnect response to protect the network (e.g., network 101) from threats posed by the specific connection.

When outliers (e.g., outliers 111) are recognized as anomalies using the models and a threat is identified by the decision console, then an anomaly response is triggered. The response may include, but not limited to, intimation to the user, for example using input/output system 117, warnings, suggested corrective action, and in the extreme disconnection of the external data source from the network, as described previously to safeguard the network.

Figure 3:
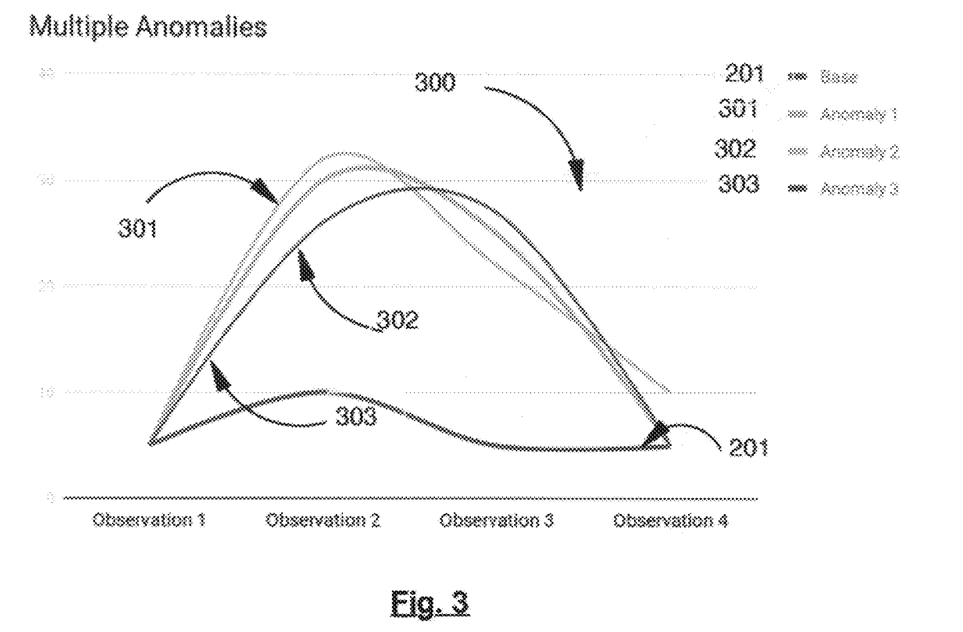
FIG. 3 is a diagram illustrating examples of multiple anomalies resulting in a threat identification and preventive action.

FIG. 3 is a diagram illustrating examples of multiple anomalies resulting in a threat identification and preventive action. In FIG. 3, graph 300 includes time series base line 201 (as previously described) and anomalies 301-303. The identification of each of the anomalies 301-303 may be similar to or same as anomaly 205 of FIG. 2, and for brevity sake, will not be described again herein.

Figure 4:
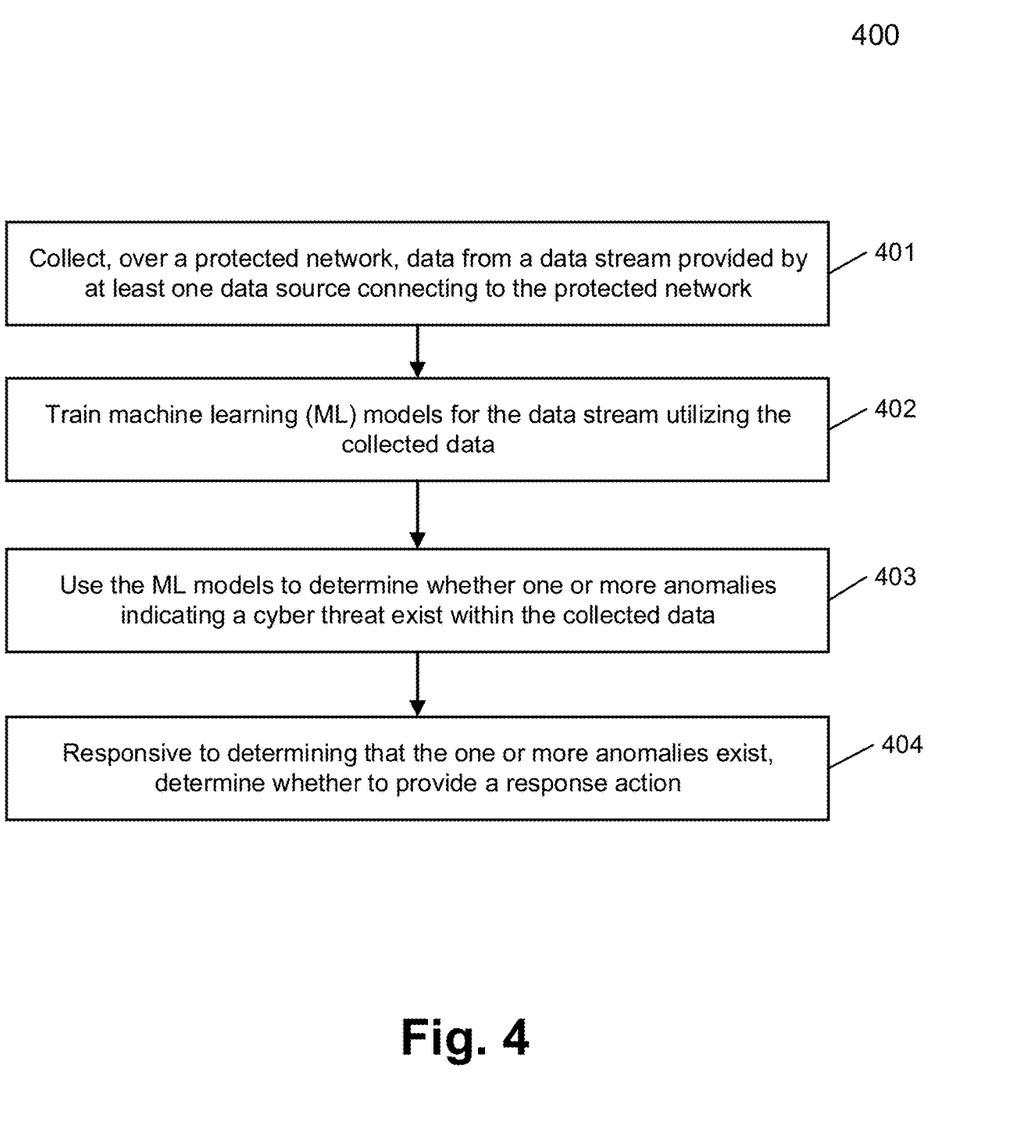
FIG. 4 is a flow chart of an example threat monitoring and analysis process according to an embodiment.

FIG. 4 is a flow chart of an example threat monitoring and analysis process according to an embodiment. In some embodiments, process 400 may be performed by system 100 of FIG. 1.

Referring to FIG. 4, at block 401, data is collected, over a protected network, from a data stream provided by at least one data source connecting to the protected network. At block 402, machine learning (ML) models are trained for the data stream utilizing the collected data. The ML models may include a first ML model to establish a baseline value, an allowed threshold value range, and a threshold value for the data from the at least one data source, and a second ML model to identify outlier data. In an embodiment, the outlier data is outside of the allowed threshold value range from the baseline value and exceeds the threshold value in the data stream. At block 403, the ML models are used to determine whether one or more anomalies indicating a cyber threat exist within the collected data. At block 404, responsive to determining that the anomalies exist, it is determined whether to provide a response action.

Figure 5:
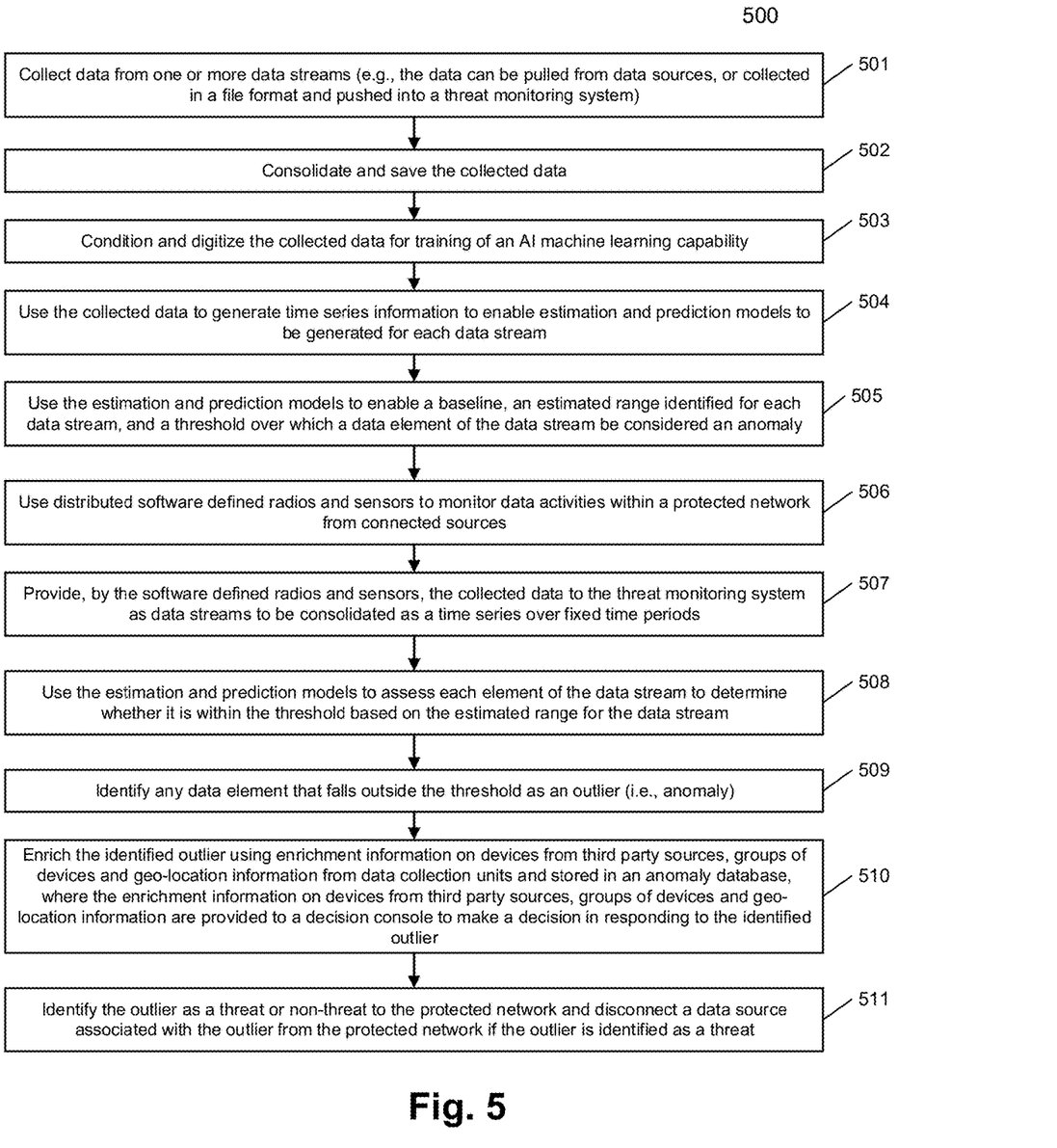
FIG. 5 is a flow diagram of another example threat monitoring and analysis process according to an embodiment.

FIG. 5 is a flow chart of another example threat monitoring and analysis process according to an embodiment. In some embodiments, process 500 may be performed by system 100 of FIG. 1.

At block 501, data from one or more data streams may be collected (e.g., pulled or retrieved by invoking API calls to public Internet services, Multi Access Mobile Edge or Cellular Mobile carriers). Where a data pull is not available, in an embodiment, the data is collected in a file format to be entered or pushed into a threat monitoring and analysis system (e.g., system 100 of FIG. 1).

At block 502, the collected data may be consolidated and converted into a time series format and stored in a data store for use in establishing baseline activity for data streams and for generating initial estimation and prediction models for activity.

At block 503, the stored time series data may be used by a machine learning (ML) training module (e.g., ML training module 106 of FIG. 1) to enable machine learning of estimation and prediction models (e.g., to train the models).

Once the learning or training process is complete, at block 504, the ML training module may generate trained estimation and prediction models of activity from each data source or each group of data sources that generates a data stream to be established. The data sources can be individual devices, groups of devices from a vendor, devices having same or similar characteristics or groups of devices within a geolocation.

At block 505, the trained estimation and prediction models enable a baseline of activity to be established with expected value for each data source and a threshold value beyond which an activity element is considered to be an anomaly that needs investigation.

At block 506, the system uses sensors that may include distributed software defined radios to monitor wireless data activity within a protected network space. These radios and sensors may continuously monitor the radio activity from all connected sources in the network space and collect information on the activity of all connected data sources connecting to the protected network.

At block 507, the collected data may be provided to the threat monitoring and analysis system as input into a data consolidation module (e.g., data consolidation module 104 of FIG. 1) to consolidate, generate and update the activity time series for each source of data. This is used to update the historical data and the estimation and prediction models, for example by an AI/ML training module (e.g., training module 106 of FIG. 1).

At block 508, in an embodiment, each data element of the data stream from each of the data sources, or groups of data sources, is provided to the AI/ML training module as part of the updated time series data to be assessed by an AI/ML analysis module using the ML capability to see of it is within the threshold of activity based on the estimated/predicted range for that data stream.

At block 509, any data element that falls outside a preset threshold may be identified as an outlier, that is an anomaly for that data source.

At block 510, in an embodiment, identified anomalies are enriched, by using previously collected enrichment information on devices from third party sources, information on groups of devices and geo-location information from the data collection units, stored in an anomaly database (e.g., database 114 of FIG. 1) and also simultaneously provided to a decision module (e.g., decision module 112 of FIG. 1). The enrichment information may be pre-stored in an enrichment partition of the anomaly database.

At block 511, in an embodiment, if an identified anomaly is limited to a single instance from a data source it may be due to an unusual event, such as a device reset, and thus there may be no reason to take any corrective action. Such an anomaly may be provided to an operator over an input/output system (e.g., system 117 of FIG. 1) for any remedial decision if needed. However, if a series of anomalies are identified, it can be considered a threat event. In such a case, a threat decision console (e.g., console 116 of FIG. 1) may take corrective action to protect the network. The corrective action may include intimation to a user, warnings to the source, suggestion for corrective action and/or disconnecting the data source from the network.

All examples and conditional language recited herein are intended for pedagogical purposes to aid the reader in understanding the principles of the present disclosure and the concepts contributed by the inventor to furthering the art and are to be construed as being without limitation to such specifically recited examples and conditions. Moreover, all statements herein reciting principles, aspects, and embodiments of the present disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to a system for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

The foregoing descriptions of various specific embodiments in accordance with the present disclosure have been presented for purposes of illustration and description. They are not intended to be exhaustive or to limit the present disclosure to the precise forms disclosed, and many modifications and variations are possible in light of the above teaching. The present disclosure is to be construed according to the claims and their equivalents.

What is claimed is:

1. A computer-implemented method for threat monitoring and analysis, comprising:
   collecting, over a protected network, data from a data stream provided by at least one data source connecting to the protected network;
   training a plurality of machine learning (ML) models for the data stream utilizing the collected data, the plurality of ML models including a first ML model to establish a baseline value, an allowed threshold value range, and a threshold value for the data from the at least one data source, and a second ML model to identify outlier data, the outlier data being outside of the allowed threshold value range from the baseline value and exceeding the threshold value in the data stream;

using the plurality of ML models to determine whether one or more anomalies indicating a cyber threat exist within the collected data; and responsive to determining that the one or more anomalies exist, determining whether to provide a response action;

wherein using the plurality of ML models to determine whether the one or more anomalies exist within the collected data comprises:

using the second ML model to check data elements of the collected data for one or more outliers, the one or more outliers each having a value that is outside of the allowed threshold value range from the baseline value and exceeds the threshold value, when the one or more outliers are identified, enriching the one or more outliers with enrichment information, and determining that the one or more enriched outliers are the one or more anomalies that exist within the collected data.

2. The method of claim 1, further comprising:
providing the response action when the one or more anomalies comprise a plurality of anomalies.

3. The method of claim 2, wherein providing the response action comprises:
disconnecting the at least one data source from input the protected network.

4. The method of claim 1, further comprising:
determining not to provide the response action when the one or more anomalies comprise a single anomaly; and
providing the single anomaly to an operator for remedial decision.

5. The method of claim 1, wherein
the method further comprises: consolidating and converting the collected data into a format;
training the plurality of ML models utilizing the collected data comprises: training the plurality of ML models utilizing the consolidated and converted data.

6. The method of claim 5, wherein the format is a time series format.

7. The method of claim 1, wherein collecting the data from the data stream comprises:
pulling the data by invoking an application programming interface (API) call to a public Internet service, multi-access mobile edge, or cellular mobile carrier; or
collecting the data as a file in a file format.

8. The method of claim 1, wherein the data is collected by software defined radios distributed across the protected network.

9. The method of claim 6, further comprising:
storing the consolidated and converted data as historical time series information; and
continually updating the historical time series information with new collected data from the data stream.

10. The method of claim 1, further comprising:
continuously providing the collected data to the first ML model to update the established baseline value, the allowed threshold value range, and the threshold value using the data collected from data stream from the at least one data source.

11. A threat monitoring and analysis system, comprising:
one or more processors;
a memory coupled to the one or more processors to store instructions, which when executed by the one or more processors, cause the threat monitoring and analysis system to perform operations, the operations comprising:

collecting, over a protected network, data from a data stream provided by at least one data source;

training a plurality of machine learning (ML) models for the data stream utilizing the collected data, the plurality of ML models including
a first ML model configured to establish a baseline value, an allowed threshold value range, and a threshold value, and
a second ML model configured to identify outlier data, the outlier data being outside of the allowed threshold value range from the baseline value and exceeding the threshold value;

using the plurality of ML models to determine whether one or more anomalies indicating a cyber threat exist within the collected data; and responsive to determining that the one or more anomalies exist, determining whether to provide a response action;

wherein using the plurality of ML models to determine whether the one or more anomalies exist within the collected data comprises:

using the second ML model to check data elements of the collected data for one or more outliers, the one or more outliers each having a value that is outside of the allowed threshold value range from the baseline value and exceeds the threshold value, when the one or more outliers are identified, enriching the one or more outliers with enrichment information, and determining that the one or more enriched outliers are the one or more anomalies that exist within the collected data.

12. The system of claim 11, wherein the operations further comprise:
providing the response action when the one or more anomalies comprise a plurality of anomalies.

13. The system of claim 12, wherein providing the response action comprises:
disconnecting the at least one data source from input the protected network.

14. The system of claim 11, wherein the operations further comprise:
determining not to provide the response action when the one or more anomalies comprise a single anomaly; and
providing the single anomaly to an operator for remedial decision.

15. The system of claim 11, wherein
the operations further comprise: consolidating and converting the collected data into a format;
training the plurality of ML models utilizing the collected data comprises: training the plurality of ML models utilizing the consolidated and converted data.

16. The system of claim 15, wherein the format is a time series format.

17. The system of claim 11, wherein collecting the data from the data stream comprises:
pulling the data by invoking an application programming interface (API) call to a public Internet service, multi-access mobile edge, or cellular mobile carrier; or
collecting the data as a file in a file format.

18. The system of claim 11, wherein the data is collected by software defined radios distributed across the protected network.

19. The system of claim 16, wherein the operations further comprise:
   storing the consolidated and converted data as historical time series information; and
   continually updating the historical time series information with new collected data from the data stream.

20. The system of claim 11, wherein the operations further comprise:
   continuously updating the established baseline value, the allowed threshold value range, and the threshold value using the data collected from data stream from the at least one data source provided to the first ML model.

* * * * *